United States Patent
Helinger et al.

(10) Patent No.: US 12,456,275 B2
(45) Date of Patent: Oct. 28, 2025

(54) SYSTEM AND METHOD OF THREE-DIMENSIONAL MODEL INTERACTION ON LOW END DEVICES WITH PHOTOREALISTIC VISUALIZATION

(71) Applicant: MERSIVX LTD., Petach Tikva (IL)

(72) Inventors: Haim Helinger, Petach Tikva (IL); Alon Dvir, Petach Tikva (IL)

(73) Assignee: MERSIVX LTD, Petach Tikva (IL)

( * ) Notice: Subject to any disclaimer, the term of this patent is extended or adjusted under 35 U.S.C. 154(b) by 189 days.

(21) Appl. No.: 18/240,371

(22) Filed: Aug. 31, 2023

(65) Prior Publication Data

US 2024/0112431 A1 Apr. 4, 2024

Related U.S. Application Data

(60) Provisional application No. 63/402,508, filed on Aug. 31, 2022.

(51) Int. Cl.
*G06T 19/20* (2011.01)
*G06T 7/13* (2017.01)
*G06V 10/24* (2022.01)
*H04N 19/597* (2014.01)

(52) U.S. Cl.
CPC .............. *G06T 19/20* (2013.01); *G06T 7/13* (2017.01); *G06V 10/24* (2022.01); *H04N 19/597* (2014.11); *G06T 2219/2004* (2013.01)

(58) Field of Classification Search
CPC ...... G06T 19/003; G06T 19/006; G06T 19/20
See application file for complete search history.

(56) References Cited

U.S. PATENT DOCUMENTS

| | | | |
|---|---|---|---|
| 2003/0218615 A1* | 11/2003 | Gelb | G06T 15/205 |
| | | | 382/233 |
| 2013/0024545 A1 | 1/2013 | Sheppard et al. | |
| 2016/0255327 A1* | 9/2016 | Cole | G06F 3/04815 |
| | | | 348/43 |
| 2020/0133462 A1 | 4/2020 | Holzer et al. | |
| 2020/0219312 A1* | 7/2020 | Jurgenson | G06T 17/00 |
| 2020/0264701 A1 | 8/2020 | Tokubo et al. | |

* cited by examiner

*Primary Examiner* — Charles Tseng
(74) *Attorney, Agent, or Firm* — PEARL COHEN ZEDEK LATZER BARATZ LLP

(57) ABSTRACT

Systems and methods are disclosed for rendering a three-dimensional (3D) environment in real time. Methods may include: rendering, by at least one first computing device, a 3D environment model to generate a visual representation of the environment, wherein the visual representation includes a plurality of frames corresponding to a plurality of locations within the 3D environment model; compressing, by the at least one first computing device, the 3D environment model to produce a compressed 3D structural model; selecting, by at least one second computing device, a portion of a frame of the visual representation for display to a user; aligning, by the at least one second computing device, a corresponding user coordinate of the compressed 3D structural model with the selected frame of the visual representation, based on the plurality of locations; and aligning, by the at least one second computing device, a corresponding field of view within the compressed 3D structural model with the selected portion of the frame.

20 Claims, 14 Drawing Sheets

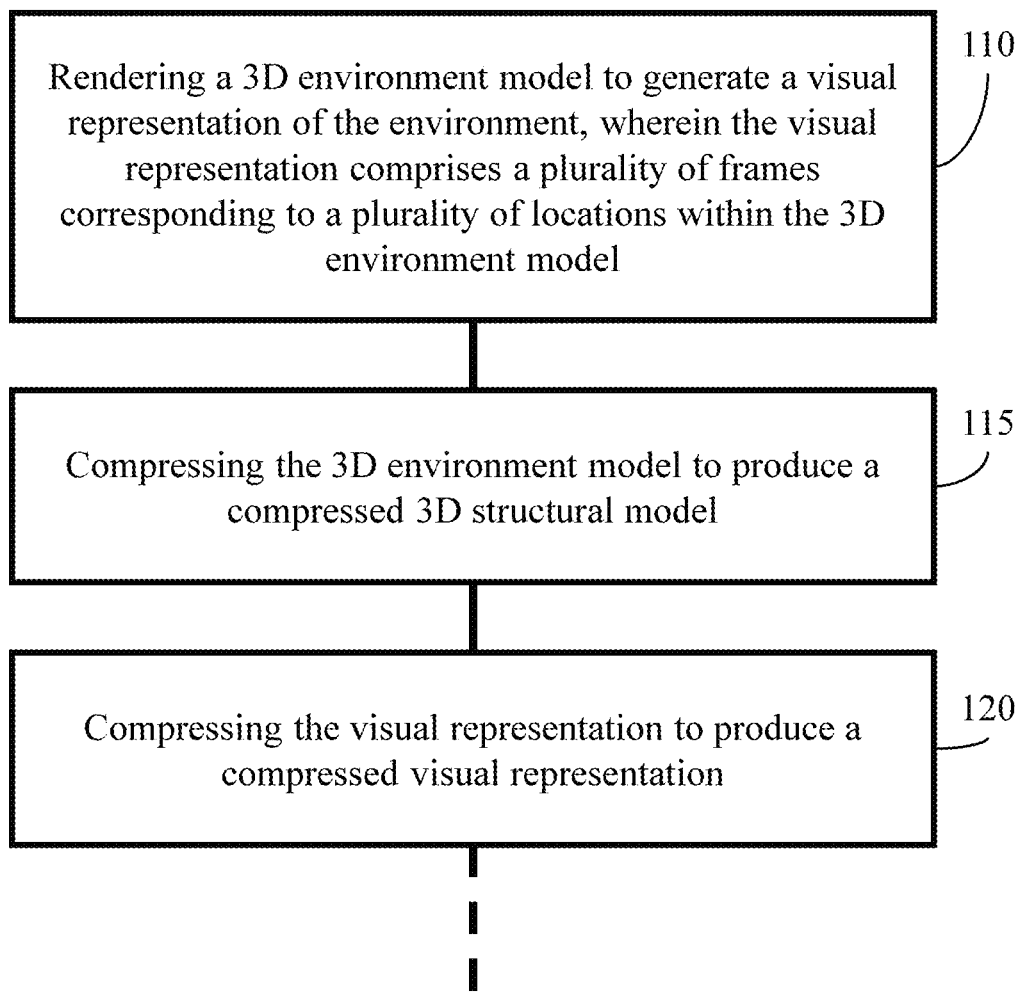

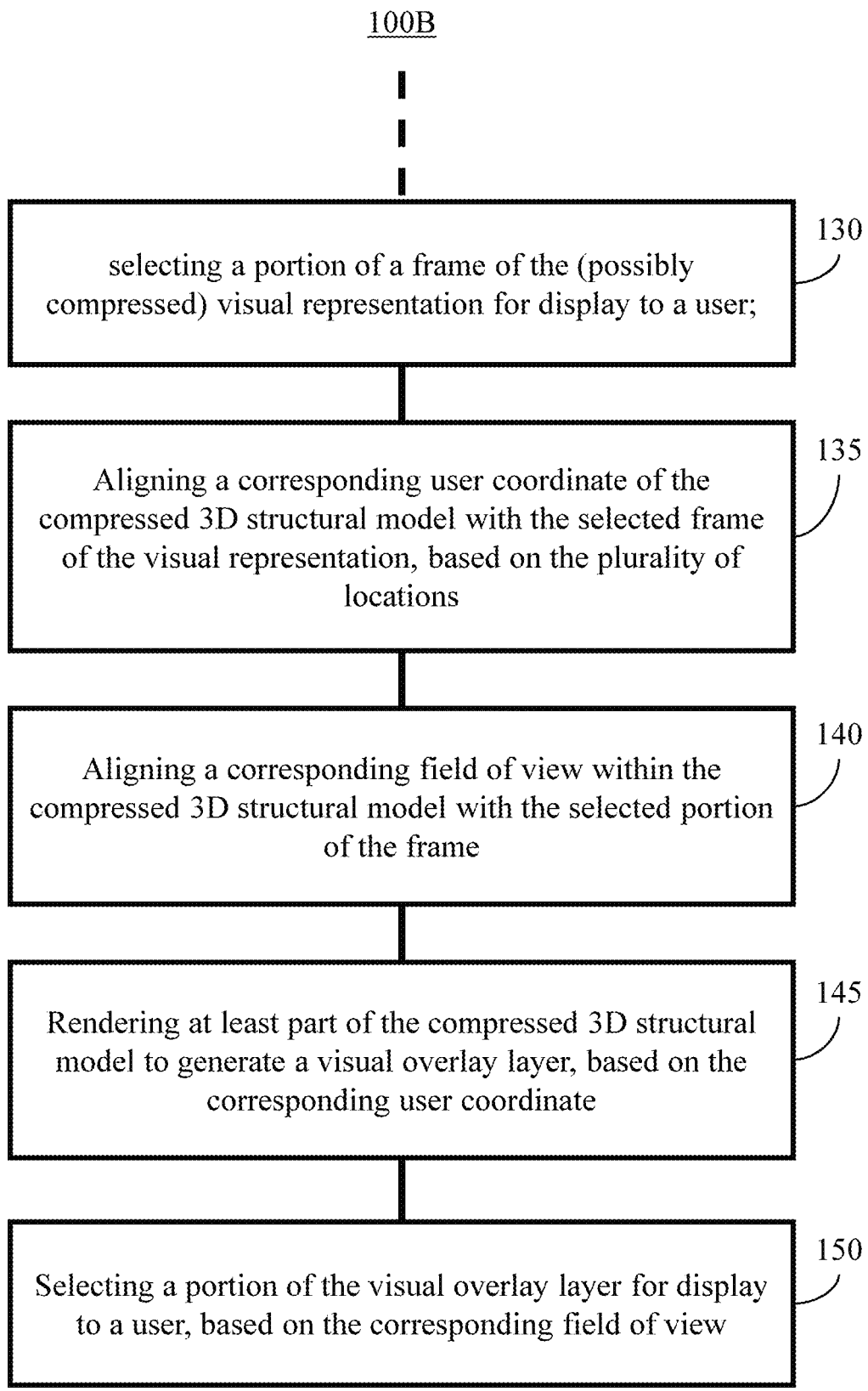

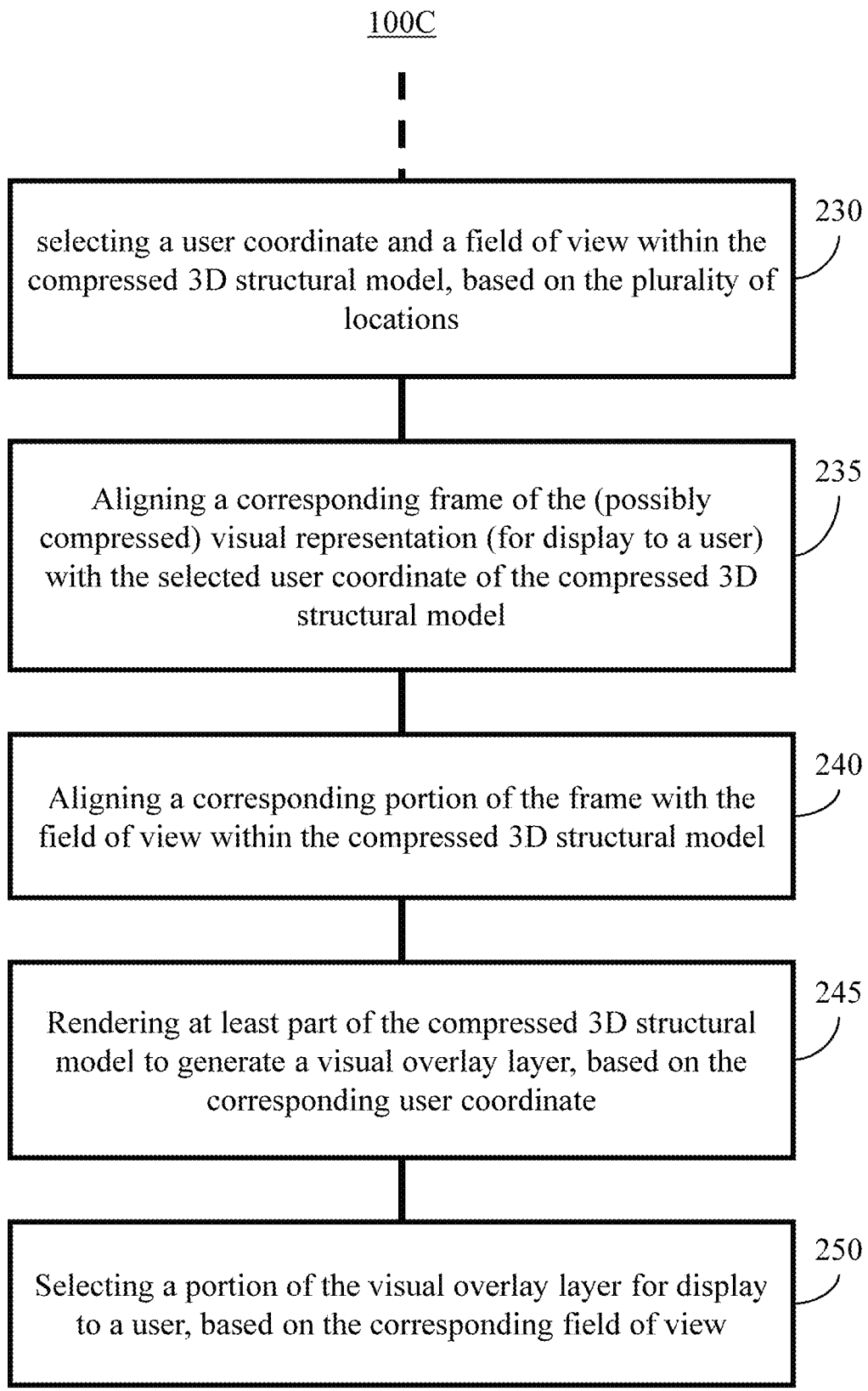

460 — replacing at least one pixel of each frame of the plurality of frames with at least one ID pixel, the ID pixel indicative of the location of the frame

465 — extracting at least one ID pixel from the selected frame of the visual representation

470 — Aligning a corresponding user coordinate of the compressed 3D structural model with the selected frame of the visual representation, based on the extracted at least one ID pixel (and optionally based on the plurality of locations)

700

900

FIG. 10
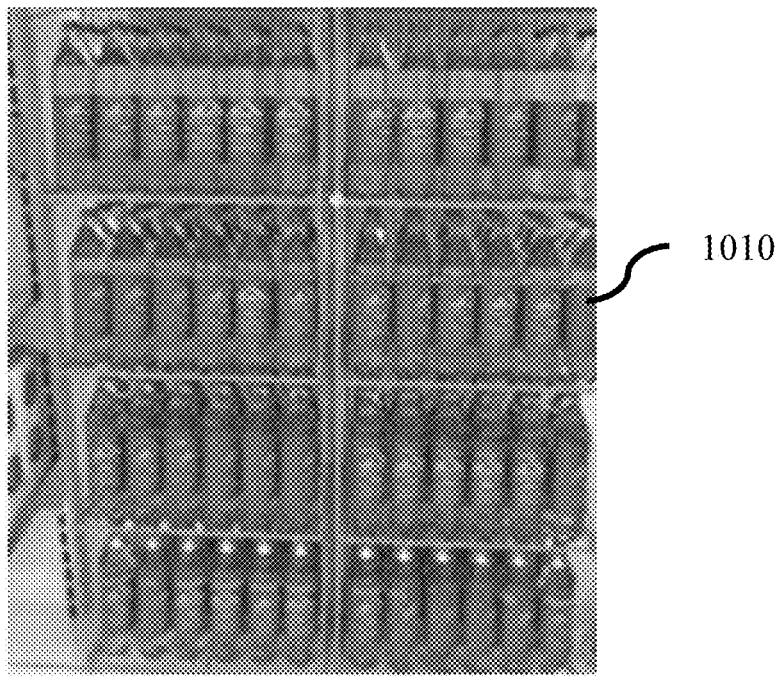
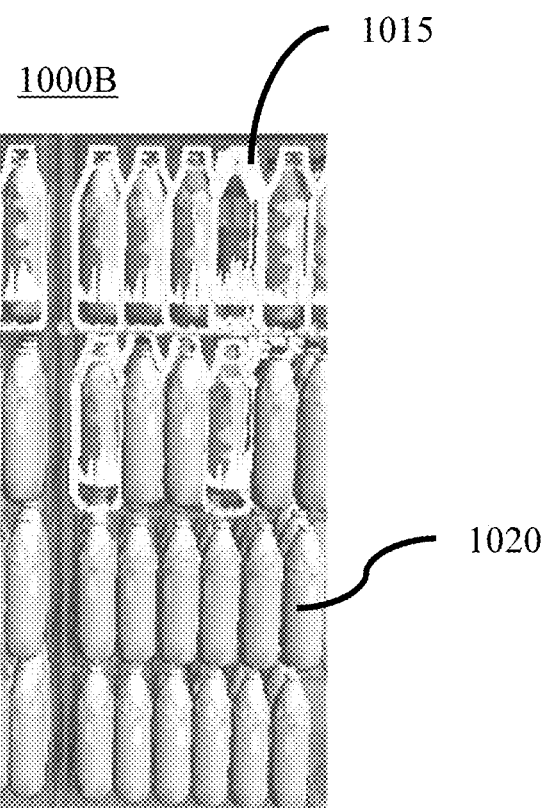

FIG. 14
1400
1410
1415
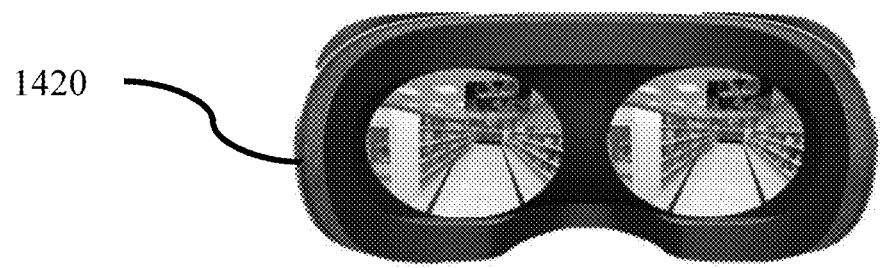
1420

SYSTEM AND METHOD OF THREE-DIMENSIONAL MODEL INTERACTION ON LOW END DEVICES WITH PHOTOREALISTIC VISUALIZATION

CROSS-REFERENCE TO RELATED APPLICATIONS

This application claims priority from U.S. Provisional Application Ser. No. 63/402,508, filed Aug. 31, 2022, which is hereby incorporated by reference in its entirety.

FIELD OF THE INVENTION

The present invention relates to computer vision and photorealistic visualization. More specifically, the present invention relates to systems and methods of three-dimensional model interaction on low end devices with photorealistic visualization.

BACKGROUND OF THE INVENTION

To visualize a three-dimensional (3D) environment requires rendering the 3D environment using a graphics card or GPU component. In order to visualize a 3D environment to a high-quality or a photorealistic quality, high-end or bulky graphic cards or GPUs may be required. This may increase the cost and/or power draw of the device, and may not be suited for battery-operated devices such as smart phones, display tablets or the like.

There is a long-felt need in the art for high-quality or a photorealistic quality visualizations of 3D environments on lower-end devices, such as a smart phone, which may not have such high-end or bulky graphic cards.

SUMMARY OF THE INVENTION

Embodiments of the invention may improve 3D interactable environment generation and rendering technology by, for example, providing for a visual representation of an environment and a (background) compressed 3D structural model, which may be aligned with the visual representation.

Some embodiments may provide a method for generating an interactable three-dimensional (3D) environment, the method including: rendering, by at least one first computing device, a 3D environment model to generate a visual representation of the environment, wherein the visual representation includes a plurality of frames corresponding to a plurality of locations within the 3D environment model; compressing, by the at least one first computing device, the 3D environment model to produce a compressed 3D structural model; selecting, by at least one second computing device in communication with the at least one first computing device, a portion of a frame of the visual representation for display to a user; aligning, by the at least one second computing device, a corresponding user coordinate in the compressed 3D structural model with the selected frame of the visual representation, based on the plurality of locations; and aligning, by the at least one second computing device, a corresponding field of view within the compressed 3D structural model with the selected portion of the frame.

Some embodiments may provide a system for generating an interactable three-dimensional (3D) environment, the system including: at least one first computing device including: a first memory; and a first processor, the first processor configured to: render a 3D environment model to generate a visual representation of the environment, wherein the visual representation includes a plurality of frames corresponding to a plurality of locations within the 3D environment model; compress the 3D environment model to produce a compressed 3D structural model; and at least one second computing device, in communication with the at least one first computing device, including: a second memory; and a second processor, the second processor configured to: select a portion of a frame of the visual representation for display to a user; align a corresponding user coordinate of the compressed 3D structural model with the selected frame of the visual representation, based on the plurality of locations; and align a corresponding field of view within the compressed 3D structural model with the selected portion of the frame.

These and other aspects of embodiments of the invention are further defined in the appended dependent claims.

BRIEF DESCRIPTION OF THE DRAWINGS

The subject matter regarded as the invention is particularly pointed out and distinctly claimed in the concluding portion of the specification. The invention, however, both as to organization and methods of operation, together with objects, features, and advantages thereof, may best be understood by reference to the following detailed description when read with the accompanying drawings in which:

FIG. 1 shows a flowchart depicting at least part of a method for generating an interactable three-dimensional environment according to some embodiments of the present invention;

FIG. 2 shows a flowchart depicting at least part of a method for generating an interactable three-dimensional environment according to some embodiments of the present invention;

FIG. 3 shows a flowchart depicting at least part of a method for generating an interactable three-dimensional environment according to some embodiments of the present invention;

FIG. 4 shows a flowchart depicting at least part of a method for generating an interactable three-dimensional environment according to some embodiments of the present invention;

FIG. 10 shows a section of a frame of a visual representation, as well as a corresponding section of a compressed 3D structural model, according to some embodiments of the present invention;

FIG. 14 shows a number of possible computing devices or output devices that may be used to display portions of frames or combined output frames, according to some embodiments of the present invention.

DETAILED DESCRIPTION OF THE INVENTION

Figure 5:
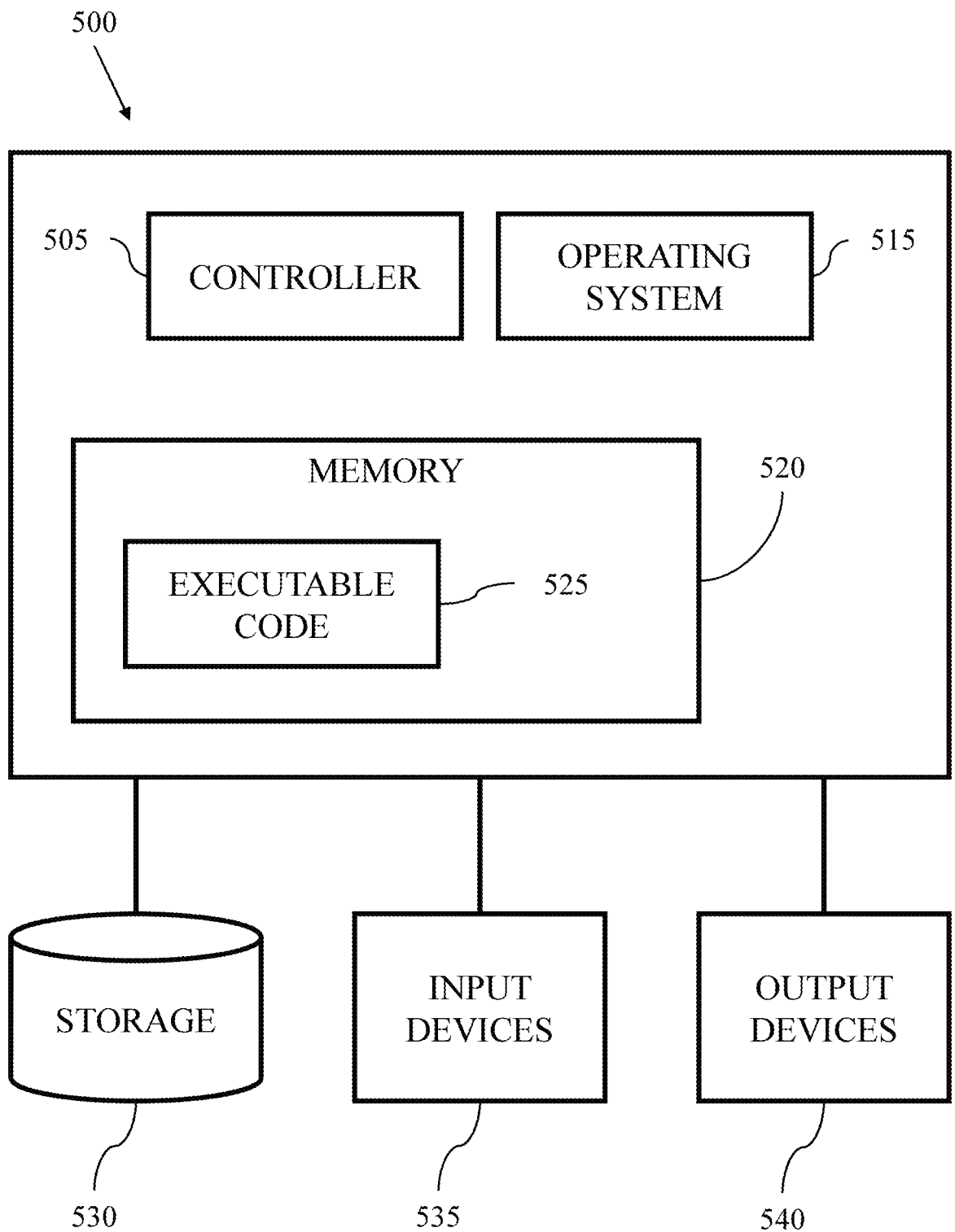
FIG. 5 shows a block diagram of an exemplary computing device which may be used with embodiments of the present invention.

One skilled in the art will realize that the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analysing", "checking", "assessing", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

As used herein, "environment" or "3D environment" may refer to an area, a structure, or set of surroundings, which may be virtual or recorded as data. An environment may refer to data itself, which records or encodes an environment. Environment data may represent an environment that also exists physically or may represent an environment that does not otherwise exist physically. In most cases, the geometry of an environment may be in three dimensions, however, two-dimensional or other dimensional environments are also possible.

As used herein, "model" or "environment model" may refer to a computational or data-based model of an environment. In some embodiments or cases, "model" and "environment" may be synonymous. In some embodiments or cases, "model" may refer to the data which records or encodes an environment. A model may contain information for one or more of the following aspects of an environment: the geometry of the environment (e.g., encoded using points and/or polygons), textures of surfaces (e.g., splat maps or sprites), lighting (e.g., positions and types of light sources), light effects (e.g., reflectivity and transparency of materials or objects), etc. In some embodiments, a plurality or set of points and/or polygons may be described as a mesh. A mesh may have vertices, faces, and/or edges. A mesh may, for example, have textures or surfaces applied to it, or the textures or surfaces may be applied separately to individual faces of the mesh. A mesh may describe part of, or the entirety of, an object or a layer. In some embodiments, a model may include a number of constituent parts, such as objects and layers. Models may be constructed using a number of computer programs and/or computer aided design programs. For example, models might be constructed using one or more of the following commercially available programs or software: Blender, Cinema 4D, LightWave, Maya, Modo, 3ds Max, 3ixam, POV-Ray, RealityCapture, Metashape, and 3DF Zephyr, Unity, Unreal, or AI tools. A model may additionally or alternatively be constructed from a real-world structure, for example, using photogrammetry, AI tools, Neural Radiance Field (NeRF) tools, etc. Constructing a model from a real-world structure may include analysing a plurality of images of a real-world structure (e.g., analysing parallax between images). A model may include metadata (e.g., labels for each object and/or layer). A model may be encoded using one or more suitable file types, for example, .OBJ and .STL.

As used herein, "structural model" may refer to a model that contains geometry information and may contain limited, little, or no other information. A structural model may still include metadata (e.g., labels for each individual object and/or layer). For example, a structural model may contain no information regarding surface textures. A plurality or set of points and/or polygons of a structural model may be described as a mesh. A mesh may have vertices, faces, and/or edges.

As used herein, "object" may refer to a particular part or entity of a model and/or particular data representing a part or entity. The object may or may not correspond to a human-recognisable object, entity, or thing (e.g., in some embodiments, the object may refer to data representing a chair, a dog, a human, sky, fog, etc.). An object may be a separate entity in that it was constructed as a separate entity during construction of the model. In some cases, an object may be static with respect to the environment surrounding it. In some cases, an object may be dynamic or movable with respect to the environment surrounding it. In some cases, an object, such as a dynamic object, may be physics based, in that it is modelled to conform to physical forces (or a computational model of physical forces). For example, a dynamic object that is physics-based may be configured to stop upon collision with another object or the environment, and/or may be configured to fall as if under the effects of gravity.

As used herein, "layers" or "layers of a model" may refer to a particular part of a model. In some embodiments, layers may include a plurality of objects and/or may include a larger environmental structure (e.g., the ground, a wall, etc.). There may be a plurality of layers in a model. In some embodiments, an entity that forms part of one layer may not form part of another layer. In some embodiments (e.g., in a commercial context) the layers may include, for example: larger environment structures, product stands, and products and branding.

As used herein, "rendering" or "image synthesising" may refer to the process of generating one or more images (or renders) from a model. Rendering may take place from the perspective of a point in space for each rendered image (or possibly more points, e.g., two may be used for 3D vision). The points in space may be encoded as a coordinate. Images may be rendered for a given field of view. In some embodiments, 360 degree or spherical images may be rendered (e.g., the image is rendered in all directions). In some embodiments, particular parts of a model may be rendered. For example, each layer (or object) may be rendered separately. In particular, if an object is dynamic, it may be rendered separately. In the example given above, the three layers of the larger environment structures, the product stands, and the products and branding may be rendered individually. The resultant images may be combined at a later stage. A particular layer may be edited and then be rendered again separately.

As used herein, "images", "image frames", and "renders" may refer to a (usually 2D) pictorial representation comprising a plurality of pixels. In the present invention, an image may be the result of a rendering process (e.g. it may have been rendered). An image may be of a higher quality if each pixel is able represent a larger range of colours, and/or if the image contains a greater number density of pixels and/or higher level of details. An image of a high quality in the context of the present invention may be described as photorealistic.

As used herein, "spherical images" or "360 degree images" may refer to an image which shows all directions around a point in space. Alternatively, a spherical image may show substantially all directions around a point in space, or, for example, all lateral or horizontal directions around a point in space, but may, for example, not show the highest and lowest points. A portion of a spherical image may be selected, in order to show a smaller field of view (e.g., 45-90 degree field of view). A portion/"portion of a frame" may correspond to a more "normal" human perspective of an environment (e.g., as may be seen through human eyes).

As used herein, "off-axis projection" or "skewed frustrum projection" may refer to methods for altering a displayed image, altering a displayed portion of an image, and/or displaying a different portion of an image, in order to give the impression to a viewer of a different point of perspective from which the image is taken and/or rendered. The implied new perspective may be one for which no image exists or is available. Off-axis projection may, in some cases, be substantially computationally faster than rendering a new image from a new perspective. An off-axis representation may be based on a plurality of images. An off-axis representation in the present invention may, for example, be based off one or more images, spherical images, visual representations, etc.

As used herein, "visual representation", "video", or "representation of a space" may refer to a plurality of images or renders, for example, as discussed above. Each of the plurality of images may be rendered or taken from a different point or perspective (e.g., as represented by a coordinate). Each point or perspective from which the images are rendered may be spatially/geometrically close in space to another point from which an image has been rendered. Each image may be spatially close enough to another, such that movement or transition from one image to another may appear continuous to a user. For example, the user may interpret moving between images as a continuous movement in space. In some examples, in order that moving between images appears continuous, each image may be rendered from a perspective no more than 5 cm away (i.e., ≤5 cm) from the perspective of its next closest rendered image (or a computational equivalent of this real-life value). Depending on the context, this value may be different, for example, if the expected speed of moving through a visual representation is higher, this value may be higher (e.g., ≤20 cm).

As used herein, "path" may refer to the positions or coordinates from which images of a visual representation are taken or rendered. For example, a path may represent a possible walkable path around a virtual supermarket, if the model and the images thereof represent or display said virtual supermarket.

As used herein, "continuous" may refer to movement through a plurality of images (or along a path) not involving noticeable jumps in the user position and/or other graphical anomalies and/or major changes in user visual view. In some embodiments, movement through images (e.g., the visual representation) is shown at a frame rate of, for example, 24 Hz, 30 Hz, 60 Hz, etc. In some cases, displaying movement through images showing different perspectives may be continuous if it is visually smooth.

As used herein, "compression" may refer to the encoding of information (e.g., information representing images, visual representations, models, structural models, etc.) using few bits or less memory than an earlier representation. Compression may be lossless, where this process is achieved without loss of information, or lossy where information is lost during compression. In compression of a structural model or a 3D model with geometry, for example, downsampling or decimation may be used. For example, for an integer N, only every Nth sample or data point may be retained in a compressed model (e.g., a model may contain fewer polygons). Similar or different methods may be used for compression of other data representations. For example, images may be compressed by decreasing an image resolution or decreasing an available colour palette/range. Image compression methods may include transform coding, colour quantization, chroma subsampling, fractal compression, run-length encoding, area image compression, predictive coding, entropy encoding, any suitable machine learning methods, etc. Compression of video and/or visual representations may use other suitable compression techniques (e.g., motion compensation).

In addition to their otherwise understood meanings, as used herein, "online" and "offline" may in some contexts of the present invention, refer to which computing device a process takes place in or on, where a process takes place, and/or when a process takes place. In one example, an offline process may take place on a server and an online process may take place on a personal device (e.g., a computer or phone). In one example, an offline process may take place first and an online process may take place second. In some embodiments, "online" processes may also be described as "real-time" processes.

As used herein, "real-time" or "real time" may refer to systems or methods with an event to system response time on the order of seconds, milliseconds, or microseconds. It may be preferable that the event to system response time is minimized, e.g., it is on the order of milliseconds or microseconds. In some cases of the present invention, real-time may refer to the existence of (or achieving) an acceptable period of time between a user input and a user device output. If this period is too long or not acceptable, a user may become frustrated and stop using devices or software configured to carry out the invention. An acceptable period of time may vary for different contexts and embodiments. In the following description, it is to be understood that systems and methods that are described as real-time embodiments may be embodiments that are suitable for real-time implementation, but which may additionally be suitable for implementation that is not in real time. Additionally or alternatively, "real-time" or "real time", as used herein, may refer to or be synonymous with "online" processes, as described above.

As used herein, "in communication with" may refer to at least two computing devices capable (at at least one point in time) of performing a data transfer between themselves. In the present application "in communication with" may not require that the computing devices in question are in communication for all of the methods disclosed herein, or for the entire duration of said methods. Communication between computing devices may be synchronous or asynchronous. Communication between computing devices may be one-way or two-way. For example, in some embodiments of the present invention, there may be an at least one first computing device and an at least one second computing device, which are described as being in communication with each other. This does not necessarily mean that the at least one first computing device and the at least one second computing device are permanently or continuously in communication (in some embodiments, there may be long periods of no active communication), but rather, it may refer to a possibility of a transfer of data between them. In some embodiments, communication may be indirect. For example, an at least one first computing device and an at least one second computing device may be "in communication" if they both have access to a same database or server (e.g., wherein at least one computing device can write to a database or server and at least one other computing device can read therefrom).

As used herein, "aligning", "synchronising", or "associating" (for example, aligning/synchronising/associating a coordinate of a 3D model with a frame of a visual representation) may refer to matching up, coordinating, or congruently updating two separate representations (or parts of representations) of an environment. For example, in some embodiments of the present invention, a corresponding user coordinate of a compressed 3D structural model may be aligned with a selected frame of a visual representation. In this example, a user may observe an environment using the visual representations by viewing selected frames. A computing device involved with the frame selection may additionally (e.g., "in the background") keep track of the location of the perspective/location from which frame was rendered, and this location may be updated in (or with respect to) the 3D model. Alignment in the present invention may allow for high-quality (e.g., pre-rendered) images to be viewed, while also maintaining in the computing device, knowledge or information regarding the structure of the environment, which may not be explicitly recorded in images. In some embodiments of the present invention, alignment of frames and frame portions of a visual representation with coordinates and fields of view of a structural model, respectively, may allow for user interactions with the environment, information to be extracted from the environment, and/or extra items/objects to be rendered in the environment (e.g., in addition to the visual representation using pre-rendered images/frames).

FIG. 1 shows a flowchart depicting at least part of a method for generating an interactable three-dimensional environment, for example, for a computing device incapable of rendering images in real time to a desired quality (e.g. a lower-end device). FIG. 1 shows method 100A. Not every aspect or operation, as laid out in FIG. 1 may need to be executed. In some embodiments, method 100A is not necessary. Method 100A may be executed "ahead of time" in that, for example, the steps of 100A may be executed before the interactable three-dimensional environment is required by a computing device (e.g., the at least one second computing device) incapable of rendering images in real time to a desired quality.

In some embodiments, method 100A (or some aspects or operations thereof may be combined with method 100B (of FIG. 2) to form a method with a greater number of steps. Method 100A may be performed by at least one computing device, for example, the same as or similar to any of devices 500 of FIG. 5 or 610, 644A, 644B, 654A, 654B, and 654C of FIG. 6. Exemplary computing devices may include cell phones, smart phones, smart watches, IoT (internet of things) devices, laptops, personal computers, servers, distributed computers, networks of computers, virtual reality headsets and/or glasses, etc.

In some embodiments, method 100A (or some aspects or operations thereof) may be performed by at least one first computing device, and method 100B (or some aspects or operations thereof) may be performed by at least one second computing device. Data may be transferred between the at least one first computing device and the at least one second computing device, for example, they may both be connected to a network, such as the internet. In some embodiments the at least one first computing device may have greater computational power (e.g., greater graphical computational power from more GPU cores) than the at least one second computing device. In some embodiments, the at least one second computing device may be accessible by a user who wishes to view a three-dimensional environment in real time. In some embodiments, at least some aspects or operations of method 100A may be performed by the at least one second computing device, and at least some aspects or operations of method 100B may be performed by the at least one first computing device.

In operation 110, a 3D environment model may be rendered to generate a visual representation of the environment. The visual representation may include a plurality of frames corresponding to a plurality of locations within the 3D environment model. Each of the plurality of locations may be adjacent (e.g., relatively close given the context of the model) to at least one other location, such that the plurality of locations may form or represent at least one path. The at least one path may be continuous, and/or may branch. For example, in the case of the environment model depicting a supermarket, the at least one path may travel at approximately human eye level height and may traverse each aisle of the supermarket (e.g., such that a visual representation of the environment shows substantially all relevant shelves in at least one frame). The locations forming a path may be close enough together, such that a path may represent or simulate continuous movement through the 3D environment (e.g., given the context of the environment, such as how quickly a user is expected to move through the environment, e.g., walking speed in a supermarket). In some embodiments, the visual representation may comprise a plurality of layers, wherein each layer of the plurality of layers may comprise different structures of the 3D environment. In some embodiments, each frame of the visual representation may comprise a spherical image.

In operation 115, the 3D environment model may be compressed or decimated to produce a compressed 3D structural model. In some embodiments, operation 115 may include one or more steps (each step might be described as a compression step in that they may reduce the data required to store the output model). Compression of the 3D environment model may involve reducing a resolution of a structural or geometric aspect of the model. For example, a number of the points or polygons may be removed and/or meshes may be simplified (e.g., using decimation methods). The newly compressed structural or geometric aspect of the model may still recognizably represent the geometry of the 3D environment, but in less detail. Compression of the 3D environment model may additionally or alternatively involve removing or compressing, some or all non-structural or non-geometric data forming part of the 3D environment model. For example, in some embodiments, textures of surfaces information, lighting information, and/or light effects information may be deleted from the file representing the 3D environment model. In some embodiments, said information may not be needed in method 100B. In some embodiments, operation 115 may involve compressing or decimating a 3D environment model to produce a compressed 3D environment model (e.g., some or all textures may still be present, but may be compressed). In some embodiments, the compressed 3D structural model may comprise a plurality of layers, wherein each layer of the plurality of layers may comprise different structures of the 3D environment.

In operation 120, the visual representation may be compressed to produce a compressed visual representation. For example, each frame of the visual representation or layers from the visual representation may be compressed using image compression techniques (e.g., as disclosed herein). The visual representation as a whole may, for example, be compressed using video compression techniques (e.g., as disclosed herein. In some embodiments, the frames of the visual representation may be rendered to the required resolution and/or level of details during operation 110, and as such, operation 120 may not be required. In some embodiments, differences of second computing devices, or of connections between first computing devices and second computing devices (e.g., different quality, bandwidth, etc.), may lead to different required levels of compression. As such, in these embodiments, it may be preferable to render to a higher quality in operation 110 and compress to the required quality on a case-by-case basis in operation 120.

Method 100A may additionally include transferring (e.g., via any suitable computer network) a 3D structural model and a visual representation from the at least one first computing device to at least one second computing device. The 3D structural model and the visual representation which are transferred may each be compressed (e.g., as produced by operations 115 and 120, respectively) or uncompressed. In some embodiments the transferred 3D structural model may be compressed and the transferred visual representation may be uncompressed, or vice versa. In some embodiments the transfer may take place shortly after the steps of method 100A (e.g. minutes, hours), whereas, in other embodiments, there may be a significant period of time (e.g. days) between the steps of method 100A and a data transfer. For example, the structural model and visual representation may have been constructed "ahead of time", and/or they may have been constructed for any second computing device that may wish to view them at some unknown future time.

In some embodiments, the 3D environment model of method 100A may be constructed on a computing device (e.g., the at least one first computing device or a device in communication therewith), for example using computer aided design (CAD) software or AI tools. Additionally or alternatively, the 3D environment model of method 100A may be constructed from a real-world structure, for example, using photogrammetry, AI tools, Neural Radiance Field (NeRF) tools, etc.

FIG. 2 shows a flowchart depicting at least part of a method for generating an interactable three-dimensional environment, for example, for a computing device incapable of rendering images in real time to a desired quality (e.g. a lower-end device). FIG. 2 shows method 100B. Not every aspect or operation, as laid out in FIG. 2 may need to be executed. In some embodiments, method 100B is not necessary. Method 100B may be executed in "real time" in that, for example, the steps of 100B may be executed if and/or when the interactable three-dimensional environment is required by a computing device (e.g., the at least one second computing device) incapable of rendering images in real time to a desired quality. Method 100B may be "real time" in that it responds to a real-time user input (e.g., quickly enough that a user does not become frustrated, for example on a timescale of seconds, milliseconds or microseconds).

In some embodiments, method 100B (or some aspects or operations thereof) may be combined with method 100A (of FIG. 1) to form a method with a greater number of steps. Method 100B may be performed by at least one computing device, for example, the same as or similar to any of devices 500 of FIG. 5 or 610, 644A, 644B, 654A, 654B, and 654C of FIG. 6. Exemplary computing devices may include cell phones, smart phones, smart watches, IoT (internet of things) devices, laptops, personal computers, servers, distributed computers, networks of computers, virtual reality headsets and/or glasses, etc.

In operation 130, a portion of a frame of the visual representation may be selected for display to a user. The visual representation may be a compressed visual representation. Selection of a portion of a frame of the visual representation may be based on a user input, e.g., to at least one user device and/or an input device (e.g., as disclosed herein) associated with the at least one second computing device. For example, there may be a touch screen input device that a user may touch or otherwise manipulate to provide an input. The input may, for example, define: which frame of the visual representation a user wishes to view, or define a continuous movement in the viewed frames; what portion of the frame the user wishes to view; what direction a user wishes to look in; and/or what zoom or magnification the user wishes to view (from some perspectives or in some cases, which portion of the frame the user wishes to view, may inherently contain information on direction and zoom/magnification). In some embodiments, there may be no user input. For example, the selection may be pre-defined (e.g., a video may be selected from the visual representation of portions of frames changing over time). In some embodiments, a user input may come from a different computing device to the at least one second computing device. In some embodiments, the frame may be a spherical image, and a portion of said frame may contain a subsection (e.g., a rectangular section) of the spherical image in a certain direction and of a certain field of view.

In some embodiments, operation 130 may include generating a new frame corresponding to a new location, using an off-axis mathematical projection, wherein the off-axis mathematical projection is based on at least one existing frame of the plurality of frames, and selecting a portion of the new frame. Off-axis mathematical projection may be as described herein.

In operation 135, a corresponding user coordinate of the compressed 3D structural model may be aligned, synchronised, or associated (e.g., as described herein) with the selected frame of the visual representation. The alignment may be based on the plurality of locations (e.g., as described herein and/or with respect to operation 110). For example, it may be unknown until an alignment takes place, the coordinate that corresponds to the presently selected frame (for display to a user), however it may in some embodiments be known that the coordinate is one of the plurality of locations. The alignment may be achieved using ID pixels, for example, by using some or all aspects of method 400, as outlined in FIG. 4. The alignment may additionally or alternatively be achieved by extracting metadata, such as a frame number and/or other frame metadata, from a selected frame and comparing this metadata to a source (e.g., a lookup table) outlining which frame metadata corresponds to which location. Said source/lookup table may be produced and/or outputted during/from operation 110 of FIG. 1 (e.g., when a frame is rendered, it may have metadata associated with it that is indicative of the location from which it was rendered).

In operation 140, a corresponding field of view within the compressed 3D structural model may be aligned, synchronised, or associated (e.g., as described herein) with the selected portion of the frame. Operation 140 may involve assessing what portion or part of a frame has been selected (e.g., by a user) for display to a user, and assessing what part of the 3D structural model this corresponds to (e.g., as viewed through a field of view). Operation 140 may involve assessing which part or view of the 3D structural model would need to be rendered, in order that a new rendered image would align with the current view or selected portion of the frame. Alignment of the compressed 3D structural model to the portion of the frame may, for example, allow for methods of the present invention to translate a particular area, pixel, or set of pixels into an identification of an object or layer. Such an identification may take place by, based on the alignment, assessing or calculating which part of the compressed 3D structural model a user may be viewing, clicking on, etc., with the visual representation, and further assessing the geometrical structure of this part of the 3D structural model. In some cases, the geometrical structure may be an object or layer. This object or layer may have associated metadata, e.g., which identifies the object or layer.

Alignment operations/steps 135 and/or 140 (and possibly other associated operations) may allow for a number of advantageous effects or possibilities. For example, alignment may allow for: rendering a visual overlay layer, replacing objects in the visual representation, adding objects to the visual representation, user interactions with the environment, identification of things in the visual representation, and other possibilities. Visual overlay layers may be as disclosed with respect to operations 145 and 150. Replacing and adding objects in the visual representation may use visual overlay layers. An example interaction with the environment may involve a user clicking or tapping part of a displayed frame portion using an input device (e.g., a mouse or touch screen). Using the alignment, the corresponding object may be identified. The object may then, for example, be identified to the user, e.g., by rendering its shape or layout and displaying such visual overly, and/or by a text popup or a voice over, and/or added to a list, e.g., an interaction list or shopping basket. Identification may be as described with respect to operation 140. Other processes may involve identification. Operations 145 and 150 (visual overlay layer steps) may not be executed during every iteration or execution of the operations of method 100B (e.g., when no visual overlay is desired or required at that specific moment in time). Operations 145 and 150 may not be executed at all in all embodiments or cases of the invention (e.g., where visual overlay layers are not desired).

In operation 145, at least part of the compressed 3D structural model may be rendered to generate a visual overlay layer. Generation of the visual overlay layer may be based on the corresponding user coordinate. In at least some respects, the rendering of operation 145 may be similar to the rendering of operation 110. However, given that rendering operation 145 may be carried out on the at least one second computing device, rather than the at least one first computing device, operation 145 may have different computational intensity requirements (e.g., correlating to the different available computing power of the respective computing devices). In some embodiments, the entirety of the compressed 3D structural model may be rendered; in some embodiments, only the part of the compressed 3D structural model within the field of view may be rendered; in some embodiments, only certain items, objects, or layers of the compressed 3D structural model may be rendered; and/or in some embodiments, other objects (e.g., as retrieved from data storage or a different computer) may be positioned in the 3D model and/or rendered. Positioning other objects may be based on external inputs and/or the user input. Other objects may include items (e.g., a product, a chair, a dog), and/or avatars (e.g., a person).

Avatars may, for example, be indicative of the position of another user which is navigating a visual representation of the environment. For example, another user may be navigating the same environment on a different computing device (e.g., according to embodiments of the present invention), and information regarding the current position of the other user (e.g., as found in an operation, such as operation 135) and/or information regarding the direction in which the other user is facing (e.g., as found in an operation, such as operation 140) may be transferred from said different computing device to the at least one second computing device configured to carry out operation 145. In some embodiments the other computing device may be one of the second computing devices.

In some embodiments, the visual overlay layer may comprise at least one of: an object, an object outline, a line, a texture, a video, an image, a material surface, an avatar, and/or an object with physics behaviour. An object with physics behaviour, may be a movable object that may, for example, not be able to move through objects and entities of the 3D structural model, and/or that may fall under gravity.

In some embodiments, visual overlay layer may include one or more videos, for example a video texture associated with a surface (e.g., surface may represent a tv or monitor surface). In such embodiments, it may be necessary to render the visual overlay layer at a desired frame rate for the video.

In operation 150, a portion of the visual overlay layer may be selected for display to a user. Selection of the portion of the visual overlay layer may be based on the corresponding field of view (and/or direction of view). For example, the parts of the visual overlay that may fit within the selected portion of the selected frame of the visual representation, may be selected for display to a user. For example, the other parts of the visual overlay may be cropped out.

As an alternative to operation 150, operation 145 may be carried out based on the corresponding user coordinate and the corresponding field of view (and/or direction of view). For example, the operation 145 may only render the relevant portion of the visual overlay instead of, for example, rendering a visual overlay for the whole frame. In some embodiments or cases, it may be preferable to only render the relevant portion of the visual overlay, in order to save on computational power in rendering. In some embodiments or cases, it may be preferable to render a visual overlay for the whole frame and select the relevant portion from it. For example, if a user does not move frame for some time, but simply rotates in the presently selected frame (e.g., different portions of the same frame are selected), this method may mean that the visual overlay does not need to be rendered a new for each change in selected frame portion.

In some embodiments, the visual overlay may be broken down into separate constituent layers. For example, one layer may include static objects, one layer may include movable or dynamic objects (e.g., an object a user can control or an avatar indicative of another user's position), and/or one layer may include video. In some embodiments or cases, the static layer may need to be rendered less often than the dynamic layer, and as such, computational power may be saved. In some embodiments, the video layer may require rendering at a desired frame rate of the video (e.g., 24 Hz, 30 Hz, 60 Hz, etc.).

In some embodiments, the selected portion of the visual overlay layer and the selected portion of the frame of the visual representation may be combined (e.g., layered on top of each other) to produce a combined output frame. The combined output frame may be suitable for displaying on a suitable output device (e.g., a monitor or phone screen).

In some embodiments, operations 145 and 150 may relate to generating and displaying an overlay or interactive layer. In some embodiments, or during some periods of time during other embodiments, an overlay or interactive layer may not be required. As such, operations 145 and 150 may not be required.

In some embodiments, the alignment of the compressed 3D structural model and the visual representation (e.g. operations 135 and/or 140) may be utilised in other ways than the way outlined in operations 145 and 150. For example, the environment may include a supermarket with items on shelves. In this example, the user may navigate the visual representation of the supermarket, and upon finding an item which they want, they may provide an input (e.g., a click on the item) to a computing device (e.g., the second computing device). Due to the existence of the aligned 3D structural model, wherein objects may be associated with metadata (e.g., item or object ID), the desired item may be identified. The desired item could then be added to an online basket, for example. For example, embodiments of the invention provide an underlying 3D structural model which is aligned with an overlying visual representation to provide contextualized interaction with the visualized environment (e.g. selecting a portion of a frame relating to a milk bottle to add the milk bottle to a shopping cart).

In some embodiments, the steps associated with method 100B may be executed repeatedly. For example, each of steps 100B may be executed 5, 10, 15, 20, 30, or 40 times a second. The more frequently the steps are repeated, the more responsive the method may be to a user's input. The less frequently the steps are repeated, the less computationally intensive the method may be on the one or more computing devices configured to execute the method.

Method 100B may additionally include displaying on at least one output device, such as a computer or phone screen (e.g., one associated with the at least one second computing device), the selected portion of the frame and/or the portion of the visual overlay layer. In the case that both portions are displayed, the visual overlay layer may be superimposed on top of the image frame, and then this combined image may be displayed.

Method 100B may additionally include retrieving and/or receiving at the at least one second computing device (e.g., via any suitable computer network), a 3D structural model and a visual representation from the at least one first computing device or any computing device or data store containing the 3D structural model and the visual representation (e.g., the at least one first computing device may store the model and visual representation in a database). The 3D structural model and the visual representation which are received may each be compressed or uncompressed. In some embodiments the transferred 3D structural model may be compressed and the transferred visual representation may be uncompressed, or vice versa.

In some embodiments, method 100B may additionally include receiving input from a user, for example, through a user input device which may be associated with the at least one second computing device. User input may be used to select which frame and which portion of said frame to display. User input may additionally or alternatively interact with the 3D structural model, for example, it may be used to select or interact with items, objects, or layers.

FIG. 3 shows a flowchart depicting at least part of a method for generating an interactable three-dimensional environment, for example, for a computing device incapable of rendering images in real time to a desired quality. FIG. 3 shows method 100C. Method 100C may be an alternative to method 100B. In some embodiments, either or both of methods 100B and 100C may be executed in the same embodiment, for example, decided based on a user input or user input type. In method 100B, a frame and a portion of said frame may be selected, and then the user coordinate and field of view of the compressed 3D structural model may be aligned to the frame and portion. In method 100C, a user coordinate and a field of view may be selected, and then the frame and the portion of said frame may be aligned with the user coordinate and field of view. For example, method 100C may carry out an opposite selection and alignment order.

In some embodiments, the selection and alignment order may be chosen based on a type of user input. In some embodiments, the alignment steps of methods 100B and 100C carry out alignment in substantially the same way. In some embodiments, methods 100B and 100C achieve substantially the same result (e.g., providing an interactable three-dimensional environment). Subsequent references to method 100B may additionally or alternatively refer to method 100C and vice versa.

Not every aspect or operation, as laid out in FIG. 3 may need to be executed. In some embodiments, method 100C is not necessary. Method 100C may be executed in "real time" in that, for example, the steps of 100C may be executed if and/or when the interactable three-dimensional environment is required by a computing device (e.g., the at least one second computing device) incapable of rendering images in real time to a desired quality. Method 100C may be "real time" in that it responds to a real-time user input (e.g., quickly enough that a user does not become frustrated).

In some embodiments, method 100C (or some aspects or operations thereof) may be combined with method 100A (of FIG. 1) to form a method with a greater number of steps. Method 100C may be performed by at least one computing device, for example, the same as or similar to any of devices 500 of FIG. 5 or 610, 644A, 644B, 654A, 654B, and 654C of FIG. 6. Exemplary computing devices may include cell phones, smart phones, smart watches, IoT (internet of things) devices, laptops, personal computers, servers, distributed computers, networks of computers, virtual reality headsets and glasses, etc.

Numbering of operations of method 100C may conform to the similar numbering of operations in method 100B. For example, operation 230 may be similar to operation 130, operation 235 may be similar to operation 135, and so on. Comments made in respect of each operation of FIG. 2 may also apply to the similar corresponding operation of FIG. 3. They may not be repeated below for conciseness.

In operation 230, a user coordinate and a field of view may be selected from within the compressed 3D structural model. This may be based on the plurality of locations.

In operation 235, a corresponding frame of the (possibly compressed) visual representation (suitable for display to a user) may be aligned with the selected user coordinate of the compressed 3D structural model.

In operation 240, a corresponding portion of the frame may be aligned with the field of view within the compressed 3D structural model.

In operation 245, at least part of the compressed 3D structural model may be rendered to generate a visual overlay layer. This may be based on the selected user coordinate.

In operation 250, a portion of the visual overlay layer may be selected for display to a user. This may be based on the selected field of view.

FIG. 4 shows a flowchart depicting at least part of a method for generating an interactable 3D environment, for example, on a computing device incapable of rendering images in real time to a desired quality. FIG. 4 shows method or partial method 400. Not every aspect or operation, as laid out in FIG. 4 may need to be executed. In some embodiments, method 400 is not necessary.

In operation 460, at least one pixel of each frame of the plurality of frames may be replaced with at least one ID pixel. The ID pixel(s) may be indicative of the location at which the frame was rendered within the model. For example, a value may be associated with the colour of each ID pixel, and the value or a combination of values may correlate to a location, position, or coordinate. The ID pixel(s) may be located at an "out-of-the-way" portion of the image, for example, the ID pixel (s) may be located at the top left corner of each frame/image. Operation 460 may be performed by the at least one first computing device, e.g., as described with respect to method 100A. In some embodiments, operation 460 may be included as part of method 100A. In some embodiments, operation 460 may be an offline process.

In operation 465, at least one ID pixel (e.g., the at least one ID pixel of operation 460) may be extracted from the selected frame of the visual representation. The at least one ID pixel that is extracted may encode the location at which the frame was rendered, e.g., through the colour of the pixel. Extracting the ID pixel may involve extracting the location or coordinate represented by the ID pixel. Operation 465 may be performed by the at least one second computing device, e.g., as described with respect to method 100B. In some embodiments, operation 465 may be included as part of method 100B. In some embodiments, operation 465 may be a real-time process.

In operation 470, a corresponding user coordinate of the compressed 3D structural model may be aligned with the selected frame of the visual representation. The alignment may be based on the extracted at least one ID pixel and/or the location value associated therewith that is associated with the location or coordinates that corresponds to the frame. The alignment may also be based on the plurality of locations (e.g., as described herein and/or with respect to operation 110). Operation 465 may be performed by the at least one second computing device, e.g., as described with respect to method 100B. In some embodiments, operation 465 may be included as part of method 100B. In some embodiments, operation 470 may replace operation 135 of method 100B. In some embodiments, operation 470 may be a real-time process.

FIG. 5 shows a block diagram of an exemplary computing device which may be used with embodiments of the present invention. Computing device 500 may include a controller or computer processor 505 that may be, for example, a central processing unit processor (CPU), a chip or any suitable computing device, an operating system 515, a memory 520, a storage 530, input devices 535 and output devices 540 such as a computer display or monitor displaying for example a computer desktop system.

Operating system 515 may be or may include code to perform tasks involving coordination, scheduling, arbitration, or managing operation of computing device 500, for example, scheduling execution of programs. Memory 520 may be or may include, for example, a Random Access Memory (RAM), a read only memory (ROM), a Flash memory, a volatile or non-volatile memory, or other suitable memory units or storage units. At least a portion of Memory 520 may include data storage housed online on the cloud. Memory 520 may be or may include a plurality of different memory units. Memory 520 may store, for example, instructions (e.g., code 525) to carry out methods as disclosed herein, for example, embodiments of methods of FIGS. 1-6. Memory 520 may use a datastore, such as a database.

Executable code 525 may be any application, program, process, task, or script. Executable code 525 may be executed by controller 505, possibly under control of operating system 515. For example, executable code 525 may be, or may execute, one or more applications performing methods as disclosed herein, such as monitoring interactions in real time. In some embodiments, more than one computing device 500 or components of device 500 may be used. One or more processor(s) 505 may be configured to carry out embodiments of the present invention by, for example, executing software or code.

Storage 530 may be or may include, for example, a hard disk drive, a solid-state drive, a compact disk (CD) drive, a universal serial bus (USB) device or other suitable removable and/or fixed storage unit. Data described herein may be stored in a storage 530 and may be loaded from storage 530 into a memory 520 where it may be processed by controller 505. Storage 530 may include cloud storage.

Input devices 535 may be or may include a mouse, a keyboard, a touch screen or pad or any suitable input device or combination of devices. Output devices 540 may include one or more displays, speakers, virtual reality headsets, and/or any other suitable output devices or combination of output devices. Any applicable input/output (I/O) devices may be connected to computing device 500, for example, a wired or wireless network interface card (NIC), a modem, printer, a universal serial bus (USB) device or external hard drive may be included in input devices 535 and/or output devices 540.

Embodiments of the invention may include one or more article(s) (e.g., memory 520 or storage 530) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

Computing device 500 may additionally comprise a communication unit for communicating, transferring, transmitting, and/or receiving data to, from, or between another computing device (e.g., one similar to device 500).

Figure 6:
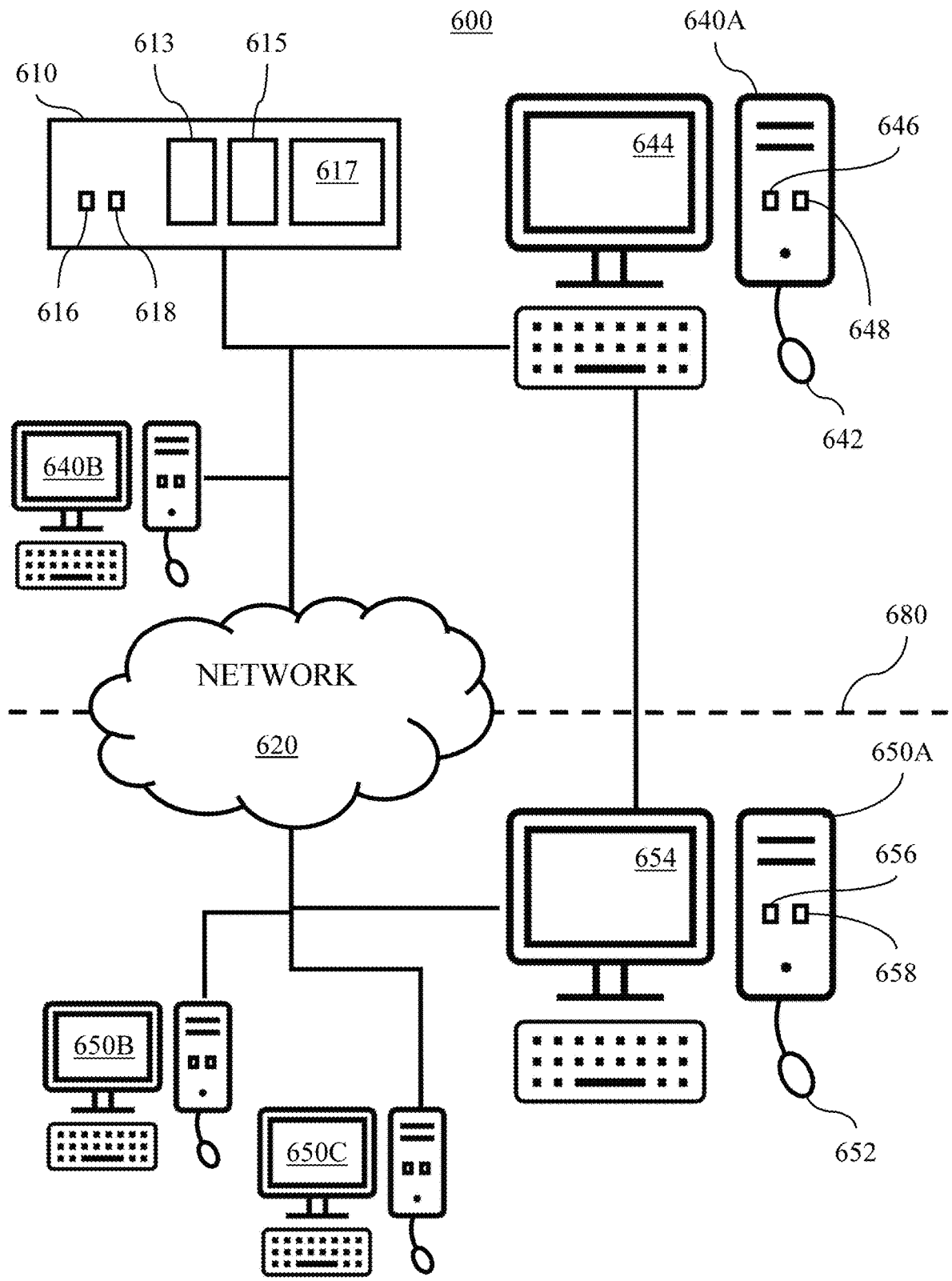
FIG. 6 is a schematic drawing of a system according to some embodiments of the invention.

FIG. 6 is a schematic drawing of a system 600 according to some embodiments of the invention, which may include at least one first computing device and/or at least one second computing device. System 600 may include one or more server(s) 610, database(s) 615, computer(s) 640A, 640B, 650A, 650B, 650C, . . . , etc., each of which may be or include computers (e.g., computer 500) or components, such as shown in FIG. 5. Any or all of system 600 devices may be connected via one or more network(s) 620. Network 620, which connects server(s) 610, computers 640 and 650, and/or telephones 660 and 670 may be any public or private network such as the Internet. Access to network 620 may be through wire line, terrestrial wireless, satellite, or other systems well known in the art. Additionally or alternatively, Any or all of system 600 devices may be connected directly to each other, for example, through wire line, terrestrial wireless, satellite, or other systems well known in the art.

Server(s) 610 and computers 640A, 640B, 650A, 650B, 650C, may include one or more controller(s) or processor(s), for example, 616, 646, and 656, for executing operations according to embodiments of the invention. They may also include one or more memory unit(s), for example, 618, 648, and 658, for storing data (e.g., models, images, and visual representations) and/or instructions (e.g., computer code representing methods 100A, 100B, and/or 300) executable by the processor(s). Processor(s) 616, 646, and/or 656 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 618, 648, and/or 658 may include, for example, a random-access memory (RAM), a dynamic RAM (DRAM), a flash memory, a volatile memory, a non-volatile memory, a cache memory, a buffer, a short-term memory unit, a long-term memory unit, or other suitable memory units or storage units.

Computers, e.g., 640 and 650, may be servers, personal computers, desktop computers, mobile computers, laptop computers, and notebook computers or any other suitable device such as a cellular telephone, personal digital assistant (PDA), video game console, etc., and may include wired or wireless connections or modems. Computers, e.g., 640 and 650, may include one or more input devices, e.g., 642 and 652, respectively, for receiving input from a user (e.g., via a pointing device, click-wheel or mouse, keys, touch screen, recorder/microphone, or other input components). Computers, e.g., 640 and 650, may include one or more output devices, e.g., 644 and 654, (e.g., a monitor, screen, a virtual reality headset, or speaker) for displaying or conveying data to a user provided by or for server(s) 610 or another computer.

In some embodiments, at least one first computer, for example, one or more of computers 640A and 640B and server 610, may be associated with and/or configured to perform at least part of method 100A. At least one second computer, for example, one or more of computers 640A, 640B, 640C (which may also include server(s)), may be associated with or used by a client or customer, and/or may be associated with or configured to perform at least part of method 100B.

A server, e.g., 610, may be responsible for managing interactions or data transfers between computers or servers over network 620.

In some embodiments, components above dashed line 680 may be associated with method 100A, whereas components below the dashed line 680 may be associated with method 100B. In other embodiments, this distinction may not be necessary.

Figure 7:
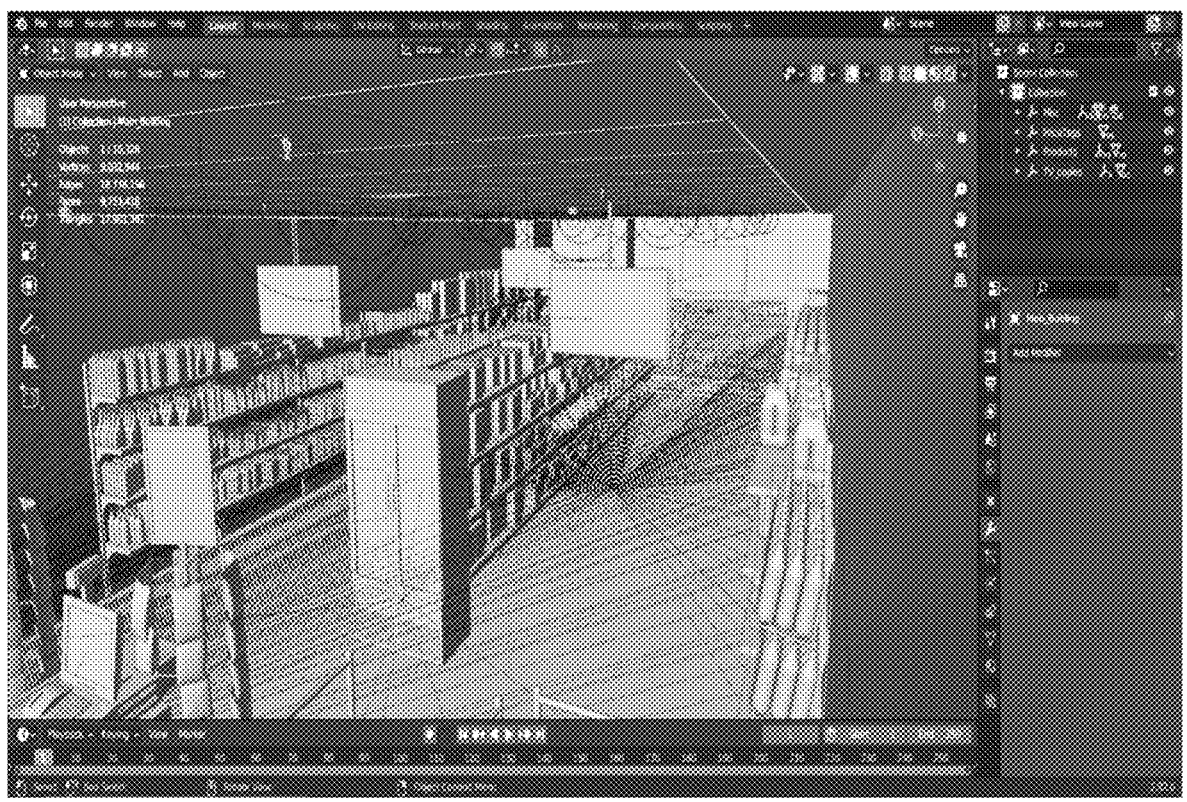
FIG. 7 shows 3D modelling creation in an example 3D modelling software or program, according to some embodiments of the present invention.

FIG. 7 shows 3D modelling creation in a possible 3D modelling software or program, according to some embodiments of the present invention. FIG. 7 shows a screenshot 700 of an example modelling program (e.g. Blender), during construction of a 3D model. In the embodiment of FIG. 7, the 3D model represents a (virtual) supermarket or grocery store. The specific choice of location in this embodiment is by no means limiting; very many other possible locations may occur to a person skilled in the art.

Figure 8:
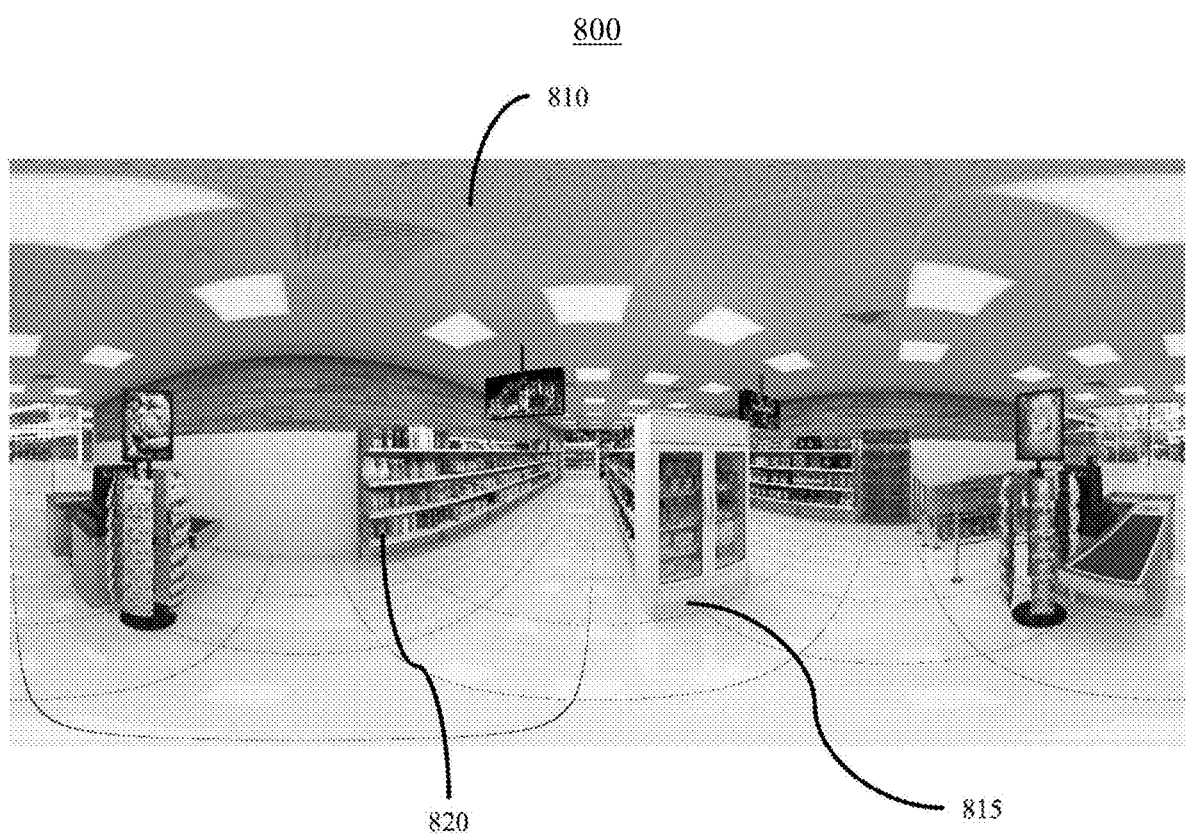
FIG. 8 shows an example frame or render which may be produced, according to some embodiments of the present invention.

FIG. 8 shows an example frame or render 800 (e.g., of a visual representation), which may be produced, for example in operation 110 of method 100A. In the embodiment of FIG. 8, the render depicts a (virtual) supermarket or grocery store. The frame 800 may include a background 810 (e.g., a ceiling), shelving or furniture 815 (e.g., a glass refrigerator), and/or products, items and objects 820 (e.g., a cereal box, a detergent bottle, posters/textures). In some embodiments, background 810, shelving or furniture 815, and smaller objects 820 may each be rendered separately. In these embodiments, frame 800 may be the result of a number (e.g., three) of combined image layers. Frame 800 may be a spherical frame or image, in that it may represent all directions from a point or coordinate in space. It may be possible to continuously join up the leftmost edge of image 800 with the rightmost edge.

Figure 9:
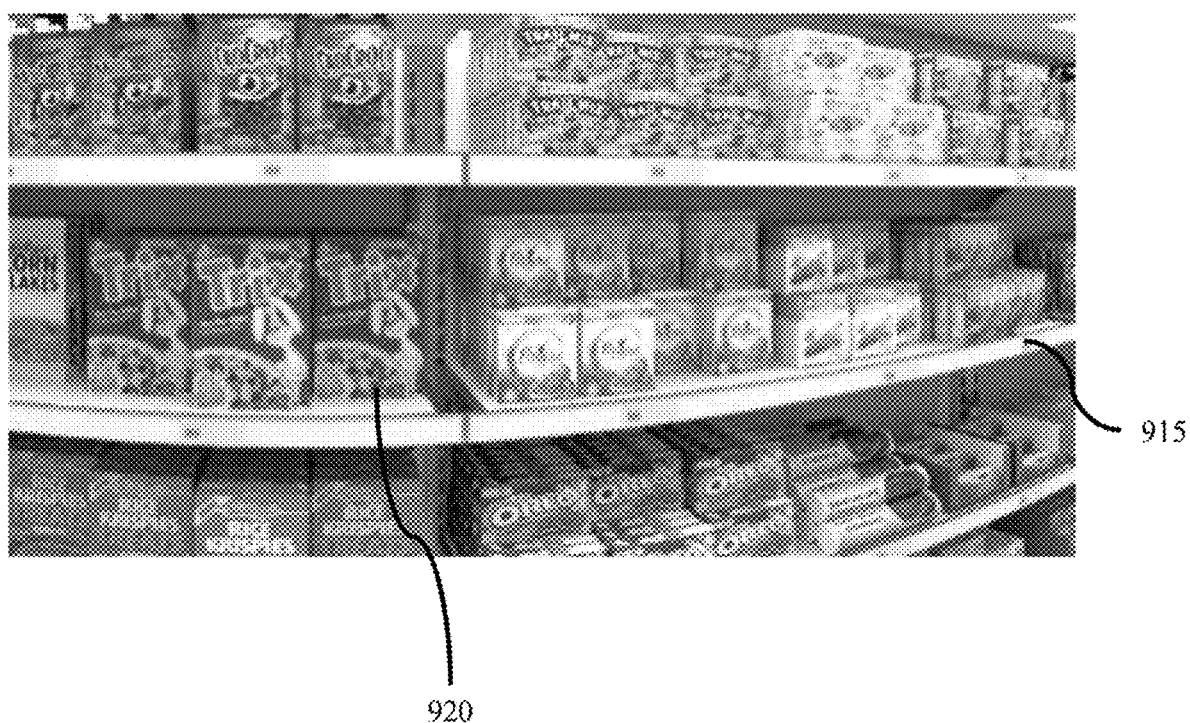
FIG. 9 shows an example portion of a frame or render, according to some embodiments of the present invention.

FIG. 9 shows an example portion 900 of a frame or render (e.g., a selected portion). In the present embodiment, the portion 900 may depict supermarket shelves 915 and products/objects 920. Portion 900 may have a smaller field of view than the original frame (e.g., like frame 800).

FIG. 10 shows a small section of a frame of a visual representation 1000A, as well as a corresponding/aligned section of a compressed 3D structural model 1000B. The visual representation may represent/show items 1010 (e.g., water bottles), and the 3D structural model may include objects representing (and/or labelled as) said items 1020. The compressed 3D structural model 1000B may be amended or altered to include additional modelled objects, such as item outlines 1015. Such additional modelled objects may be rendered in operation 145.

Figure 11:
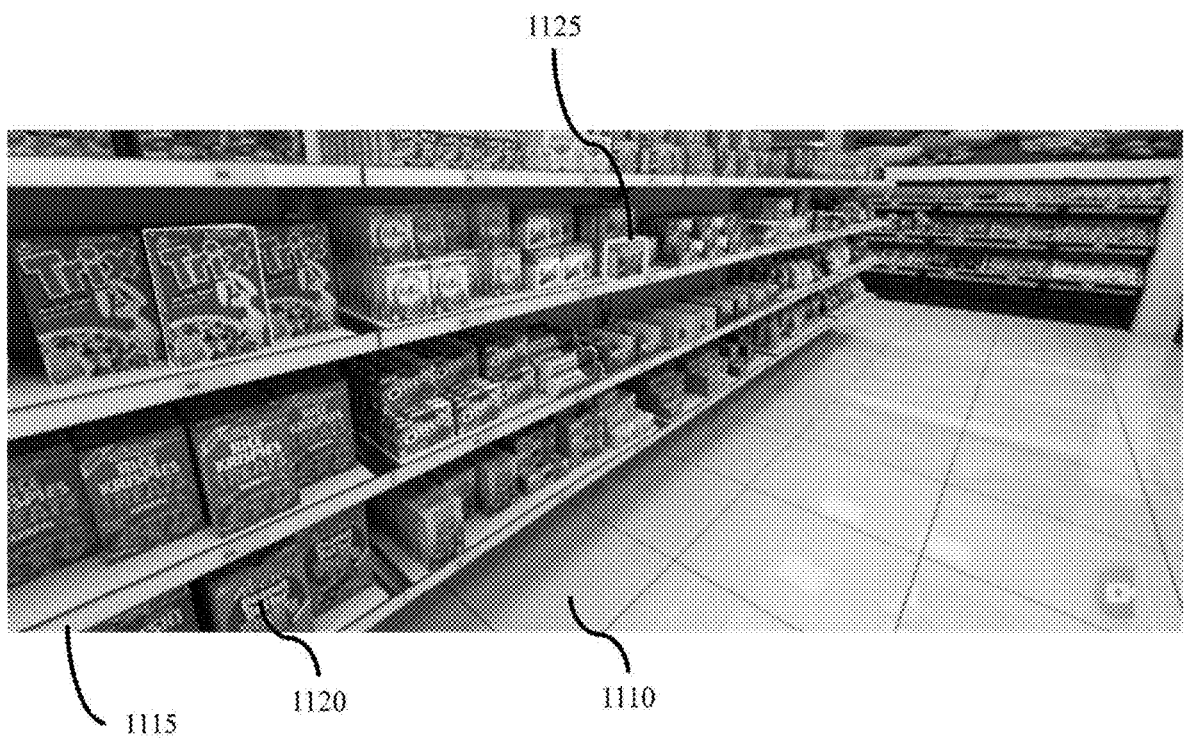
FIG. 11 shows a combination of a selected portion of a frame with its corresponding portion of a visual overlay layer, which may be combined into a combined output frame according to some embodiments of the present invention.

FIG. 11 shows a combination of a selected portion of a frame with its corresponding portion of a visual overlay layer, which may be combined into a combined output frame 1100. Said output frame may include a background 1110, shelving or furniture 1115, and/or products, items and objects 1120, for example, as in frame 800 of FIG. 8. The output frame may additionally include additional visual effects or components 1125, for example one or more outlines (e.g., product outlines). Outlines may, for example, indicate desired objects, objects that are interactable, or objects that are selected by the user.

Figure 12:
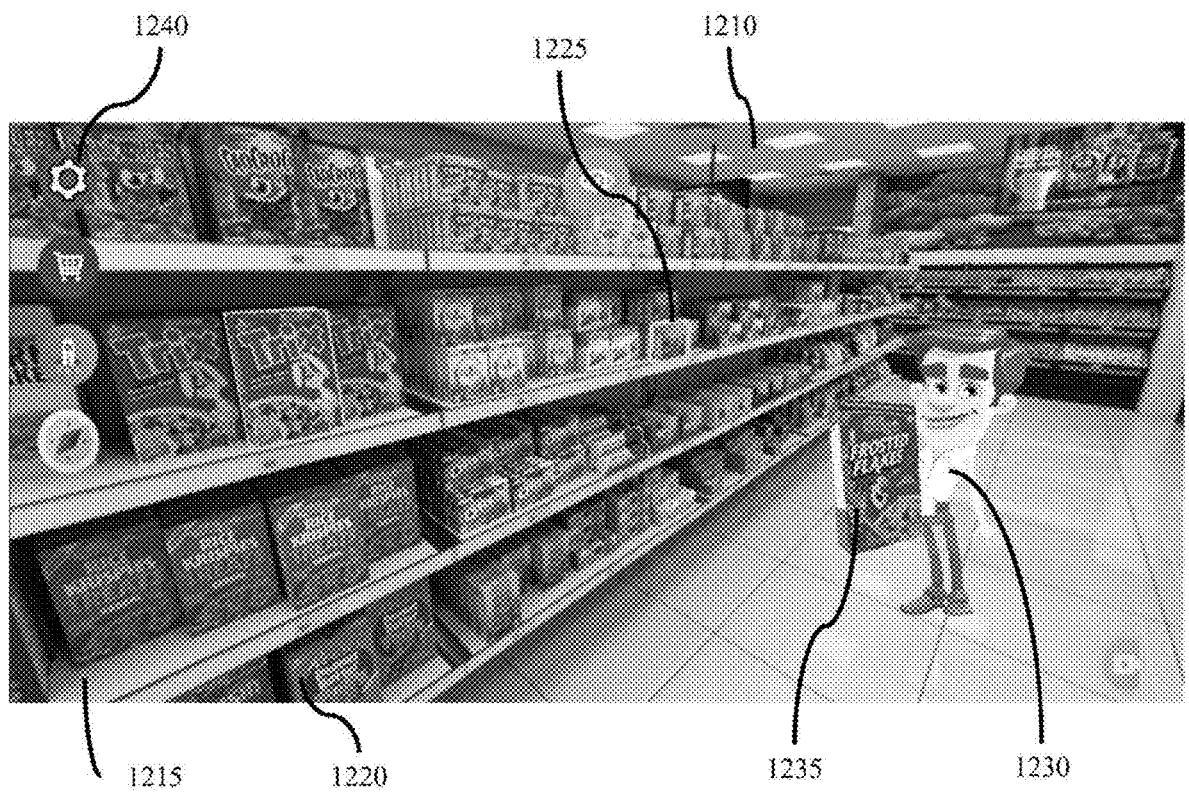
FIG. 12 shows a combination of a selected portion of a frame with its corresponding portion of a visual overlay layer and a graphical user interface overlay, which may be combined into a combined output frame in accordance with some embodiments of the present invention.

FIG. 12 shows a combination of a selected portion of a frame with its corresponding portion of a visual overlay layer and a graphical user interface overlay 1240, which may be combined into a combined output frame 1200. Combined output frame may be configured to be displayed on a computing device output device (e.g., a monitor or phone screen). The graphical user interface overlay may align with locations of possible input to a computer program which may be displaying said combined output frame. As before, the combined output device may include a background 1210, shelving or furniture 1215, and/or products, items and objects 1220. As before, the output frame may additionally include additional visual effects or components, such as outlines. Other additional visual effects or components are also represented in output frame 1200, for example, an avatar 1230, and an additionally rendered movable, interactable object 1235 (e.g., a cereal box).

Figure 13:
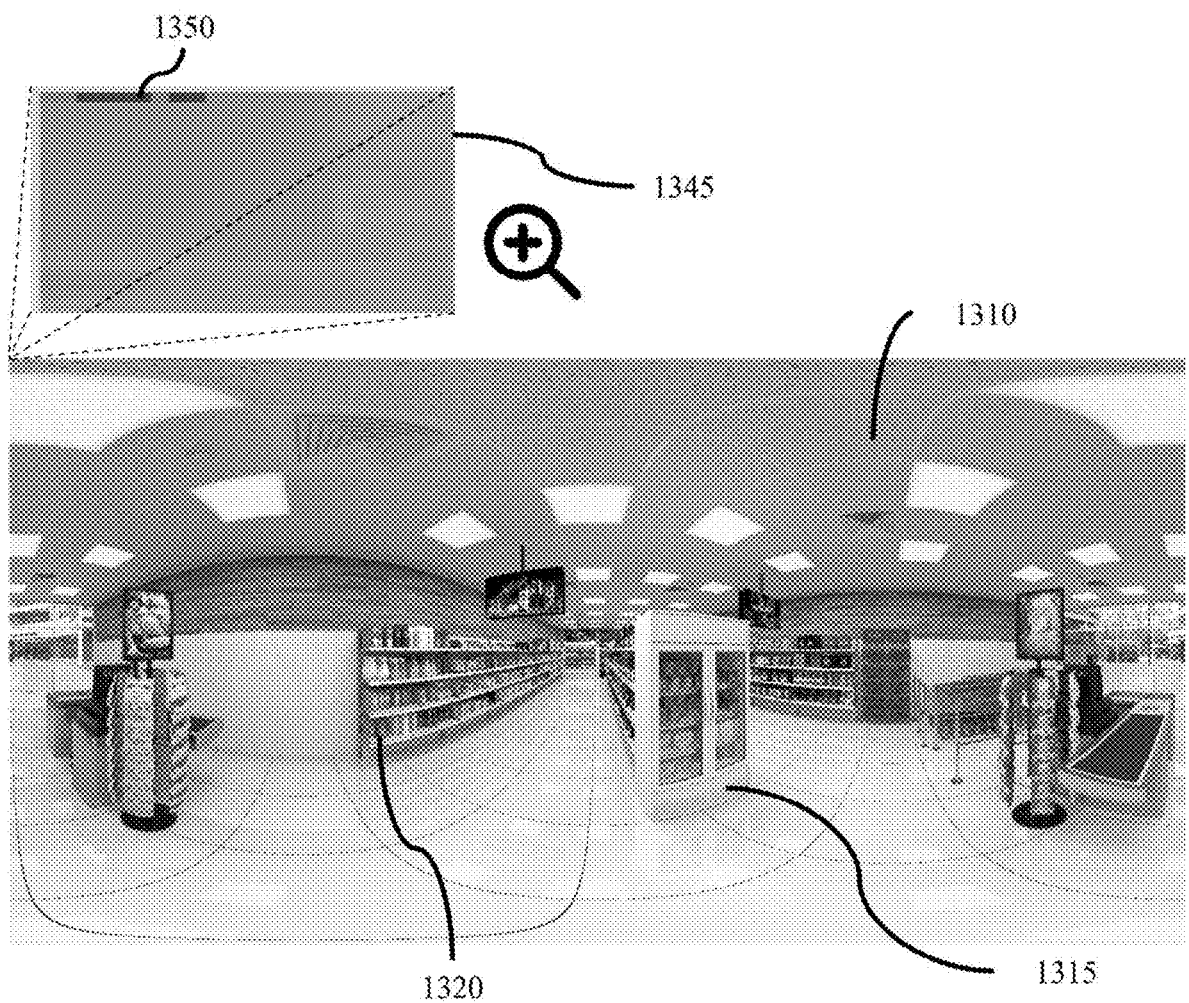
FIG. 13 shows a frame or render with one or more ID pixels, according to some embodiments of the present invention.

FIG. 13 shows a frame or render 1300, which may be similar to that displayed in FIG. 7. Frame 1300 may include background 1310 (e.g., a ceiling), shelving or furniture 1315 (e.g., a glass refrigerator), and/or products, items and objects 1320 (e.g., a cereal box, a detergent bottle, posters/textures). The render 1300 may also include one or more ID pixels 1350, for example, as described in and with respect to FIG. 4. The one or more ID pixels may be visible in the zoomed section of the frame 1345. The one or more ID pixels of frame 1300 are disposed at the top left-hand corner of the frame. The ID pixels may, for example, be used in alignment operation 135 and/or method 300.

FIG. 14 shows a number of possible computing devices and/or output devices 1400 that may be used to display portions of frames and/or combined output frames as discussed herein. The possible computing devices and/or output devices may in some embodiments correspond to the at least one second computing device. The possible computing devices and/or output devices may additionally or alternatively be in communication with the at least one second computing device. The possible computing devices and/or output devices may include, for example, a smart or cellular phone 1410, a computer or laptop 1415, and/or a virtual reality headset, glasses or similar 1420.

Systems and methods of the present invention may improve 3D interactable environment generation and rendering technology. For example, embodiments of the present invention may allow highly realistic (e.g., photorealistic) environments to be generated that may then be configured for display on a computing device in a manner that has relatively low and undemanding computational power requirements (e.g., graphical requirements). The displayed environments may additionally be interactable (e.g., in ways that a simple video are not), due to the existence of the (background) 3D structural model. The 3D model may also allow the displayable environments to be enhanced, e.g., with additional objects or visual effects. Moving through the 3D interactable environments may additionally be smooth, in that there may be no noticeable jump between different displayed frames. In some embodiments, the present invention may be particularly preferable as it is capable of simultaneously being photorealistic, having smooth movement, being interactable, and having relatively low computational power requirements. Accordingly, such technical problems as how to improve the graphical processing capabilities of lower-end devices in real-time may be solved by embodiments of the invention.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of generating an interactable three-dimensional (3D) environment, the method comprising:
   rendering, by at least one first computing device, a 3D environment model to generate a visual representation of the interactable 3D environment, wherein the visual representation comprises a plurality of frames corresponding to a plurality of locations within the 3D environment model;
   compressing, by the at least one first computing device, the 3D environment model to produce a compressed 3D structural model;
   selecting, by at least one second computing device in communication with the at least one first computing device, a portion of a frame of the visual representation for display to a user;
   aligning, by the at least one second computing device, a corresponding user coordinate of the compressed 3D structural model with the selected frame of the visual representation, based on the plurality of locations; and
   aligning, by the at least one second computing device, a corresponding field of view within the compressed 3D structural model with the selected portion of the selected frame.

2. The method of claim 1, further comprising:
   compressing, by the at least one first computing device, the visual representation to produce a compressed visual representation for use by the at least one second computing device.

3. The method of claim 1, further comprising:
   rendering, by the at least one second computing device, at least part of the compressed 3D structural model to generate a visual overlay layer, based on the corresponding user coordinate; and
   selecting, by the at least one second computing device, a portion of the visual overlay layer for display to the user, based on the corresponding field of view.

4. The method of claim 3, wherein the visual overlay layer comprises at least one of: an object, an object outline, a line, a texture, a video, an image, a material surface, an avatar, and an object with physics behaviour.

5. The method of claim 1, wherein each of the plurality of locations is adjacent to at least one other location, such that the plurality of locations forms at least one path, wherein the at least one path represents continuous movement through the interactable 3D environment.

6. The method of claim 1, wherein at least one of the visual representation and the compressed 3D structural model comprise a plurality of layers, wherein each layer of the plurality of layers comprises different structures of the interactable 3D environment.

7. The method of claim 1, further comprising:
replacing, by the at least one first computing device, at least one pixel of each frame of the plurality of frames with at least one identification (ID) pixel, the ID pixel indicative of a location of that frame; and
extracting, by the at least one second computing device, at least one ID pixel from the selected frame of the visual representation;
wherein aligning the corresponding user coordinate of the compressed 3D structural model with the selected frame of the visual representation is based on the extracted at least one ID pixel.

8. The method of claim 1, wherein selecting the selected portion of the selected frame of the visual representation for display to the user is based on a user input to at least one user input device.

9. The method of claim 1, wherein each frame of the visual representation comprises a spherical image.

10. The method of claim 1, wherein selecting the selected portion of the selected frame of the visual representation comprises:
generating a new frame corresponding to a new location, using an off-axis mathematical projection, wherein the off-axis mathematical projection is based on at least one existing frame of the plurality of frames; and
selecting a portion of the new frame.

11. A system for generating an interactable three-dimensional (3D) environment, the system comprising:
at least one first computing device comprising:
a first memory; and
a first processor, the first processor configured to:
render a 3D environment model to generate a visual representation of the interactable 3D environment, wherein the visual representation comprises a plurality of frames corresponding to a plurality of locations within the 3D environment model;
compress the 3D environment model to produce a compressed 3D structural model; and
at least one second computing device, in communication with the at least one first computing device, comprising:
a second memory; and
a second processor, the second processor configured to:
select a portion of a frame of the visual representation for display to a user;
align a corresponding user coordinate of the compressed 3D structural model with the selected frame of the visual representation, based on the plurality of locations; and
align a corresponding field of view within the compressed 3D structural model with the selected portion of the selected frame.

12. The system of claim 11, wherein the at least one first computing device is further configured to:
compress the visual representation to produce a compressed visual representation for use by the at least one second computing device.

13. The system of claim 11, wherein the at least one second computing device is further configured to:
render at least part of the compressed 3D structural model to generate a visual overlay layer, based on the corresponding user coordinate;
align the visual overlay layer with the selected frame of the visual representation; and
select a portion of the visual overlay layer for display to the user, based on the corresponding field of view.

14. The system of claim 13, wherein the visual overlay layer comprises at least one of: an object, an object outline, a line, a texture, a video, an image, a material surface, an avatar, and an object with physics behaviour.

15. The system of claim 11, wherein each of the plurality of locations is adjacent to at least one other location, such that the plurality of locations forms at least one path, wherein the at least one path is configured to simulate continuous movement through the interactable 3D environment.

16. The system of claim 11, wherein at least one of the visual representation and the compressed 3D structural model comprise a plurality of layers, wherein each layer of the plurality of layers comprises different structures of the interactable 3D environment.

17. The system of claim 11, wherein the at least one first computing device is further configured to:
replace at least one pixel of each frame of the plurality of frames with at least one identification (ID) pixel, the ID pixel indicative of a location of that frame; and
the at least one second computing device is further configured to:
extract the at least one ID pixel from the selected frame of the visual representation;
wherein aligning the corresponding user coordinate of the compressed 3D structural model with the selected frame of the visual representation is based on the extracted at least one ID pixel.

18. The system of claim 11, wherein selecting the selected portion of the selected frame of the visual representation for display to the user is based on a user input to at least one user input device.

19. The system of claim 11, wherein each frame of the visual representation comprises a spherical image.

20. The system of claim 11, wherein selecting the selected portion of the selected frame of the visual representation comprises:
generating a new frame corresponding to a new location, using an off-axis mathematical projection, wherein the off-axis mathematical projection is based on at least one existing frame of the plurality of frames; and
selecting a portion of the new frame.

* * * * *